United States Patent
Gorka et al.

(10) Patent No.: US 9,350,287 B2
(45) Date of Patent: May 24, 2016

(54) VEHICLE WITH ELECTRICAL MACHINE AND METHOD FOR OPERATING THE SAME

(71) Applicant: Bayerische Motoren Werke Aktiengesellschaft, Munich (DE)

(72) Inventors: Matthias Gorka, Munich (DE); Daniel Findeisen, Erding (DE); Dominik Hecker, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/478,836

(22) Filed: Sep. 5, 2014

(65) Prior Publication Data

US 2015/0061567 A1   Mar. 5, 2015

Related U.S. Application Data

(63) Continuation of application No. PCT/EP2013/053231, filed on Feb. 19, 2013.

(30) Foreign Application Priority Data

Mar. 6, 2012   (DE) .......................... 10 2012 203 525

(51) Int. Cl.
*H02P 25/22* (2006.01)
*B60L 11/18* (2006.01)
*B60L 15/00* (2006.01)
(Continued)

(52) U.S. Cl.
CPC ............ *H02P 25/22* (2013.01); *B60L 11/1803* (2013.01); *B60L 11/1868* (2013.01);
(Continued)

(58) Field of Classification Search
CPC ........................................................ H02P 25/22
USPC ......................................... 318/724, 801, 800
See application file for complete search history.

(56) References Cited

U.S. PATENT DOCUMENTS 6,518,736 B2 *   2/2003   Sasaki et al. .................... 322/16
7,872,440 B2 *   1/2011   Atarashi ................. B60L 11/14
                                                    318/727

(Continued)

FOREIGN PATENT DOCUMENTS

| CN | 101357596 A | 2/2009 |
| DE | 102 44 229 A1 | 4/2003 |

(Continued)

OTHER PUBLICATIONS

German Search Report dated Nov. 20, 2012, with Statement of Relevancy (Six (6) pages).

(Continued)

*Primary Examiner* — David S Luo
(74) *Attorney, Agent, or Firm* — Crowell & Moring LLP

(57) ABSTRACT

The invention relates to a vehicle having a multiphase electric machine, comprising a first onboard power subsystem provided with a first nominal DC voltage level, and a second onboard power subsystem provided with a second nominal DC voltage level, wherein the electric machine comprises a rotor, a first stator system, and a second stator system. The first onboard power subsystem comprises a first inverter having a first intermediate circuit capacitor. The first stator system is dedicated to the first inverter. The second onboard power subsystem comprises a second inverter having a second intermediate circuit capacitor, and the second stator system is dedicated to the second inverter. The first stator system is configured in a star connection, the second stator system is configured in a star connection, and a transfer circuit connects the star point of the first stator system to the star point of the second stator system.

15 Claims, 6 Drawing Sheets

(51) Int. Cl.
 *H02M 3/156* (2006.01)
 *H02P 25/02* (2016.01)

(52) U.S. Cl.
 CPC ............ *B60L15/007* (2013.01); *H02M 3/156* (2013.01); *H02P 25/021* (2013.01); *B60L 2210/12* (2013.01); *B60L 2210/14* (2013.01); *B60L 2220/54* (2013.01); *B60L 2220/56* (2013.01); *B60L 2220/58* (2013.01); *Y02T 10/641* (2013.01); *Y02T 10/645* (2013.01); *Y02T 10/7005* (2013.01); *Y02T 10/7066* (2013.01); *Y02T 10/7225* (2013.01); *Y02T 10/7233* (2013.01)

(56) References Cited

U.S. PATENT DOCUMENTS 8,013,553 B2 * 9/2011 Taniguchi ............... H02P 25/22
 318/400.27
2004/0222754 A1 11/2004 Ochiai et al.
2007/0241719 A1 10/2007 Itoh et al.
2009/0033274 A1 2/2009 Perisic et al.
2009/0128076 A1 5/2009 Taniguchi

FOREIGN PATENT DOCUMENTS

| DE | 10 2005 048 096 A1 | 4/2007 |
| DE | 10 2008 034 662 A1 | 2/2009 |
| DE | 10 2010 002 318 A1 | 8/2011 |
| DE | 10 2010 043 997 A1 | 1/2012 |

OTHER PUBLICATIONS

International Search Report dated Oct. 1, 2013 (Three (3) pages).

Chinese Office Action issued in Chinese counterpart application No. 201380012664.3 dated Nov. 9, 2016, with English translation (Sixteen (16) pages).

* cited by examiner

VEHICLE WITH ELECTRICAL MACHINE AND METHOD FOR OPERATING THE SAME

CROSS REFERENCE TO RELATED APPLICATIONS

This application is a continuation of PCT International Application No. PCT/EP2013/053231, filed Feb. 19, 2013, which claims priority under 35 U.S.C. §119 from German Patent Application No. 10 2012 203 525.7, filed Mar. 6, 2012, the entire disclosures of which are herein expressly incorporated by reference.

BACKGROUND AND SUMMARY OF THE INVENTION

The invention relates to a vehicle having a multiphase electric machine, comprising a first onboard power subsystem provided with a first nominal DC voltage level, and a second onboard power subsystem provided with a second nominal DC voltage level, wherein the electric machine comprises a rotor, a first stator system, and a second stator system. The first onboard power subsystem comprises a first inverter having a first intermediate circuit capacitor. The first stator system is dedicated to the first inverter. The second onboard power subsystem comprises a second inverter having a second intermediate circuit capacitor, and the second stator system is dedicated to the second inverter.

Typically, components in a vehicle, which are electrical energy consumers, are supplied by an onboard power supply network with a nominal DC voltage level of 14 volts. A secondary 12 volt energy store, which in the onboard power system assumes the function of an energy source or the function of an energy sink, depending on the operating state, and a 14 volt generator are designed to provide an electrical power output of 2-3 kW in the vehicle.

If several consumers with higher power requirements are integrated in the onboard power system, the onboard power system can be provided with two onboard power subsystems. A DC regulator then transfers electrical power between the two onboard power subsystems. The electric machine, which in a vehicle having an electrified drive train can also be motor-operated, has, apart from at least one energy store per onboard power subsystems, the function as electrical energy source or energy sink in the vehicle. An onboard power system topology such as this is illustrated in the patent specification of DE 102 44 229 A1, for example.

It is an object of the invention to describe an improved vehicle having an electric machine and two onboard power subsystems, and a method for operating said electric machine.

This objective is attained by a vehicle according to claim 1. Advantageous embodiments and further developments of the invention are the subject matter of the dependent claims.

According to the invention, both the first stator system and the second stator system are configured in a star connection, and a transfer circuit connects the star point of the first stator system to the star point of the second stator system. This means that the two star points of the stator systems can be directly coupled to one another electrically.

According to a preferred embodiment of the invention, the transfer circuit comprises a first diode and a second diode, which are connected in opposite directions and in series.

The transfer circuit further comprises a first switch connected in parallel to the first diode, or as an alternative, a second switch connected in parallel to the first diode.

It is also particularly beneficial if the transfer circuit comprises the first switch that is connected in parallel to the first diode, and the second switch that is connected in parallel to the second diode.

The diodes connected in opposite directions ensure that, with the first switch open and/or the second switch open, the direct electrical coupling of the two star points is ineffective. With the first switch closed and/or with the second switch closed, there is a direct electrical connection between the two star points in form of a very low ohmic connection by way of a series connection of two closed switches, or a series connection of a switch and a diode.

In a further variation of the invention, the first inverter is provided with three high side switches and three low side switches, and the second inverter is provided with three high side switches and three low side switches. The three high side switches of the first inverter and the three low side switches of the first inverter can be actuated by pulse-width modulation. The three high side switches of the second inverter and the three low side switches of the second inverter can be actuated by pulse-width modulation, with the first switch open and with the second switch open, the electric machine can be motor-operated or generator-operated, or in a mixed mode, by pulse-width modulated actuation of the high side switches and the low side switches of the first inverter and the second inverter. Connected in parallel to the low side switches and to the high side switches is a low side diode, or a high side diode, respectively.

This means that with respect to both onboard power systems, the machine can be used as a generator or as a motor, regardless whether the machine of the respective other onboard power system at a given time of operation is being utilized as a motor or as a generator. When operated as a generator, the respective onboard power system is supplied with electrical energy via the respective stator system as a result of a torque impressed on the rotor externally (for example, by a combustion engine of the vehicle). When operated as a motor, electrical energy is extracted from the respective onboard power system via the respective stator system and is converted to rotational energy of the rotor, which is tapped externally (for example, by a belt-driven consumer) from the rotor as torque.

It is particularly beneficial if the first nominal DC voltage level exceeds the second nominal DC voltage level in the direction of higher voltage level with respect to a reference voltage in the vehicle, for example, an electrical mass of the vehicle shared by the two onboard power subsystems, and when the rotor is stationary, the electric machine can be operated as DC voltage step-down converter between the first onboard power subsystem and the second onboard power subsystem.

The electric machine can be operated as DC voltage step-down converter because in a stationary mode, that is, as soon as a continuous current flow from one onboard power subsystem to the other onboard power subsystem is established, the low side switches of the second inverter are opened, the high side switches of the second inverter are closed, the low side switches of the first inverter are opened, and the high side switches of the first inverter are controlled in a pulse-width modulated manner.

As an alternative, the low side switches of the first inverter can also be controlled in a pulse-width modulated manner complementary to the high side switches of the first inverter, in order to reduce transmission losses.

In this regard, in order to prevent a bridge short-circuit between high and low side switches, a dead time is to be provided, during which both high side and low sides switches are open.

In addition, the excitation winding of the rotor can be electrically short-circuited.

When the high side switches of the first inverter are closed, the voltage difference between the first onboard power subsystem and the second onboard power subsystem lies across the effective inductance, which is formed by the three parallel-connected inductances of the first stator system in series to the three parallel-connected inductances of the second stator system. During this switch-on time, the current in the inductance increases linearly, and the average value thereof can be tapped off a load as direct current. During the switch-off phase, the inductance decreases the energy content while the intermediate circuit capacitor of the second onboard power subsystem is being charged. In order to form a freewheel for the current, the low side switches of the first inverter can either be closed or can remain open. In the latter case, the low side diodes of the first inverter lead.

In order to improve the start-up behavior of the DC-to-DC operation, that is during the transition from a rotating operation to a standstill operation, the low side switches of the second inverter can initially be closed, and the high side switches of the second inverter can be opened. Thus, the full voltage of the first onboard power subsystem lies across the effective inductance instead of the difference of the voltage between the first onboard power subsystem and the second onboard power subsystem, by way of which a higher power increase can be achieved. The transition into the stationary mode is controlled by pulse-width modulated operation of the high side switches and the low side switches of the second inverter.

Furthermore, it is particularly advantageous if the first nominal voltage level exceeds the second nominal voltage level towards higher nominal voltage level, and with the rotor being stationary, the electric machine can be operated as a DC step-up converter from the second onboard power subsystem to the first onboard power subsystem.

The electric machine can be operated as a DC step-up converter because the low side switches of the second inverter are opened, the high side switches of the second inverter are closed, the high side switches of the first inverter are opened, and the low side switches of the first inverter are controlled in a pulse-width modulated manner.

In addition, the excitation winding of the rotor can be electrically short-circuited.

In order to reduce transmission losses, the high side switches of the first inverter can also be controlled in a pulse-width modulated manner complementary to the low side switches of the first inverter. In this case, in order to prevent a bridge short-circuit between high and low side switches, a dead time is to be provided, during which high side and low sides switches are open.

If the low side switches of the first inverter are closed, the voltage of the second onboard power subsystem lies across the effective inductance, which is formed by the three parallel-connected inductances of the first stator system in series to the three parallel-connected inductances of the second stator system. During this switch-on time, the current in the inductance increases linearly, and the induction builds up energy content. Simultaneously, the high side diodes of the first inverter block so that the voltage at the intermediate circuit capacitor of the first onboard power subsystem can be adjusted to the voltage of the second onboard power subsystem. During the switch-off phase, the induction decreases the energy content, and the intermediate circuit capacitor of the first onboard power subsystem is being charged. The high side switches of the first inverter can thereby either switched on or remain closed. In the latter case, the high side diodes of the first inverter lead.

Hereafter, a preferred exemplary embodiment of the invention is described with reference to the enclosed drawings. Therefrom, further details, preferred embodiments, and further developments of the invention become evident, wherein is shown schematically in:

Other objects, advantages and novel features of the present invention will become apparent from the following detailed description of one or more preferred embodiments when considered in conjunction with the accompanying drawings.

BRIEF DESCRIPTION OF THE DRAWINGS

Identical reference numerals specify identical technical characteristics.

DETAILED DESCRIPTION OF THE DRAWINGS

Figure 1:
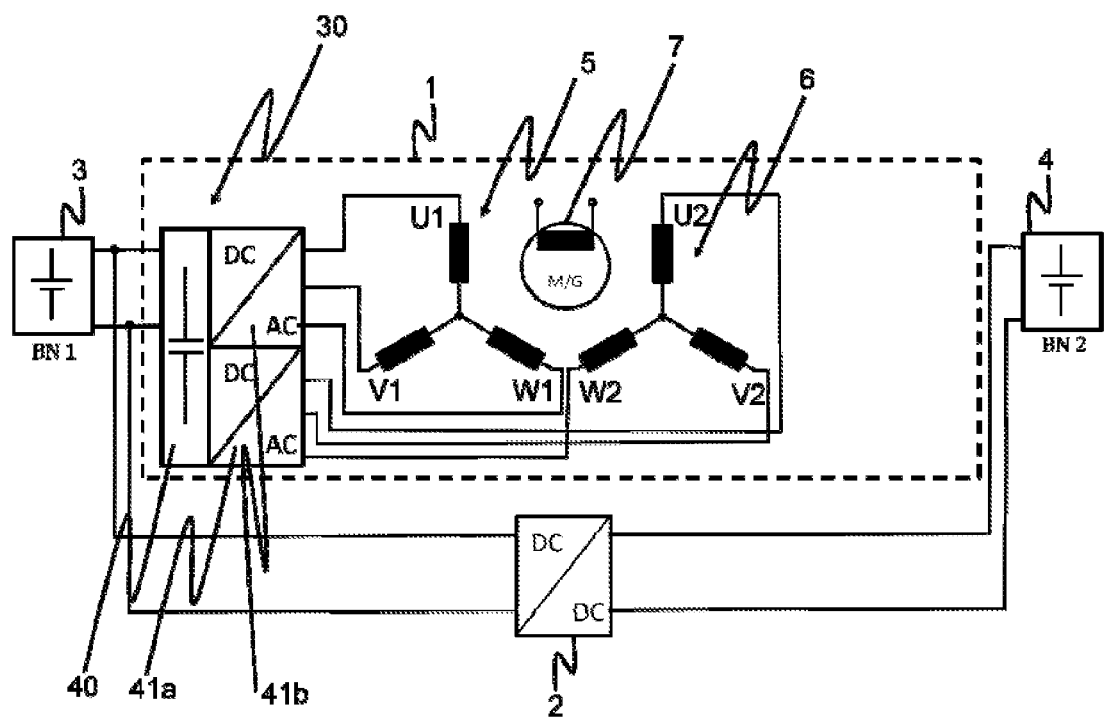
FIG. 1 vehicle with electric machine and two onboard power subsystems according to the state of the art, FIG. 2 vehicle with electric machine, two onboard power subsystems, and a transfer circuit suitable for buck operation, and with the electric machine in normal operating mode, FIG. 3 vehicle with electric machine, two onboard power subsystems, and a transfer circuit suitable for boost operation, and with the electric machine in normal operating mode, FIG. 4 vehicle with electric machine, two onboard power subsystems, a transfer circuit suitable for buck operation and boost operation, and with the electric machine in normal operating mode, FIG. 5 vehicle with electric machine, two onboard power subsystems, with a transfer circuit suitable for buck operation and boost operation, and with the electric machine in buck operating mode, and FIG. 6 vehicle with electric machine, two onboard power subsystems, with a transfer circuit suitable for buck operation and boost operation, and with the electric machine in boost operating mode.

According to the state of the art, apart from the two onboard power systems, essentially at least four components are required for a dual voltage onboard power system, see FIG. 1. They are an electric machine (1), a direct current regulator (2) between the two onboard power systems (BN1, BN2), and an energy store (3, 4) in each of the two onboard power systems. The electric machine can be comprised of two 3-phase stator systems, which can essentially be constructed in an identical manner. The two stator systems can also be connected to one another at a certain electrical angle.

The onboard power system (BN2) can be a conventional 12 volt onboard power system, for example, and the onboard power system (BN1) can be an onboard power system having a higher nominal voltage level. As an alternative, the onboard power system (BN1) and the onboard power system (BN2) can be provided with a comparable nominal voltage level of 400 volts, for example, if somewhat different energy stores, for example, a lithium ion battery and a double-layer capacitor, are combined with one another. Both onboard power systems are provided with a higher electrical potential, which essentially is determined by each of the two nominal voltage levels, and a lower electrical potential shared by both onboard power systems, and linked to the mass of the vehicle, as the case may be. The actual voltage levels of the respective higher electrical potentials of the two onboard power systems can deviate from the respective nominal voltage levels at any desired point in time of operation.

The direct voltage regulator allows the unidirectional or bi-directional transfer of output, or energy, between the two onboard power systems independently of the state of the electric machine.

According to the state of the art, a multi-phase electric machine, for example, a 6-phase machine having two each 3-phase windings in a star connection (5, 6) can be used as an electric machine. The stator is operated by way of a converter system (30) and an intermediate circuit capacitor (40), wherein a DC-AC converter (41a, 41b) is dedicated to one of the two 3-phase coil systems. Depending on the type of machine, the rotor (7) can either be fitted exclusively with permanent magnets, be provided with an exciter winding having an inductive transmitter and rotating rectifier or a slip ring system, or can be configured as short-circuit squirrel-cage rotor. The electric machine can be generator-operated (e operating mode) or motor-operated (m operating mode).

Exemplary embodiments of the invention become evident in FIGS. 2 to 6. An electric machine having two 3-phase coil systems in star configuration (5, 6) and a rotor (7) are integrated in a vehicle having at least two onboard power subsystems (BN1', BN2'). Both onboard power subsystems have at least one electrical energy store (3', 4') each at their disposal. Furthermore, both onboard power subsystems are provided with a higher electrical potential, which essentially is determined by the two nominal voltage levels, respectively, and a lower electrical potential shared by both onboard power subsystems, and may be linked to the mass of the vehicle. The actual voltage levels of the respective higher electrical potentials of the two onboard power systems can deviate from the respective nominal voltage levels of the two onboard power systems at any desired point in time of operation.

Figure 2:
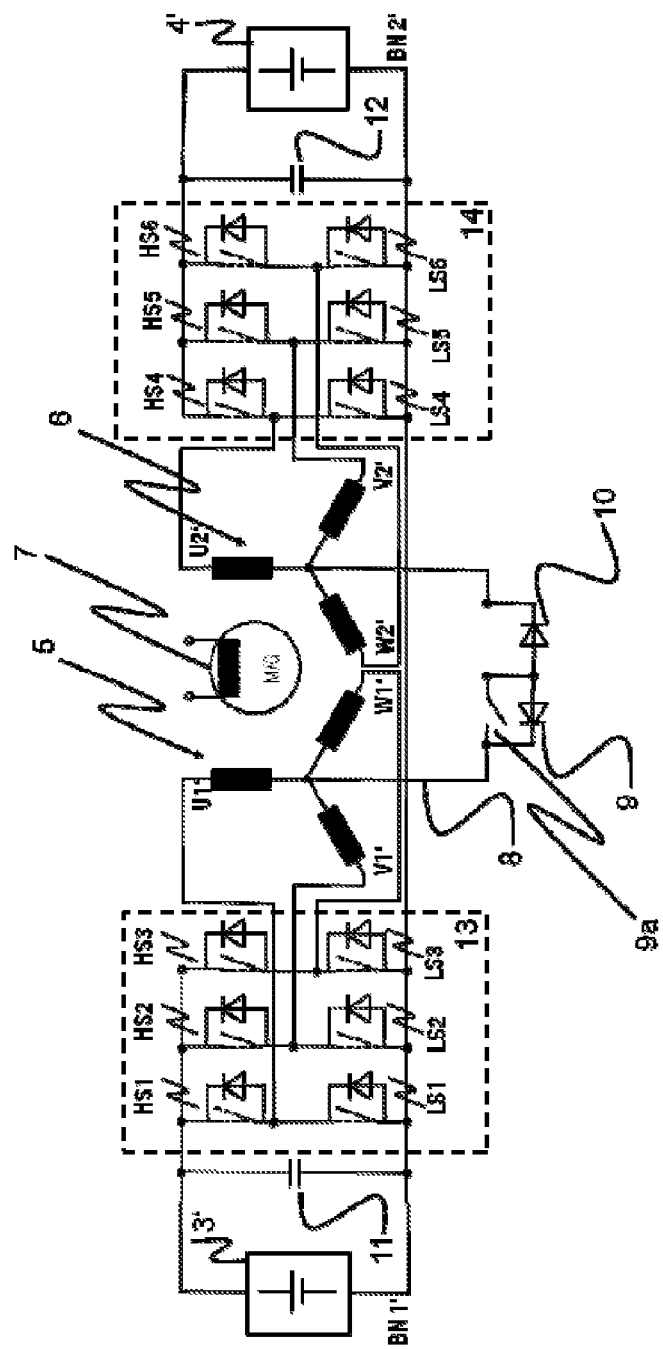
Figure 3:
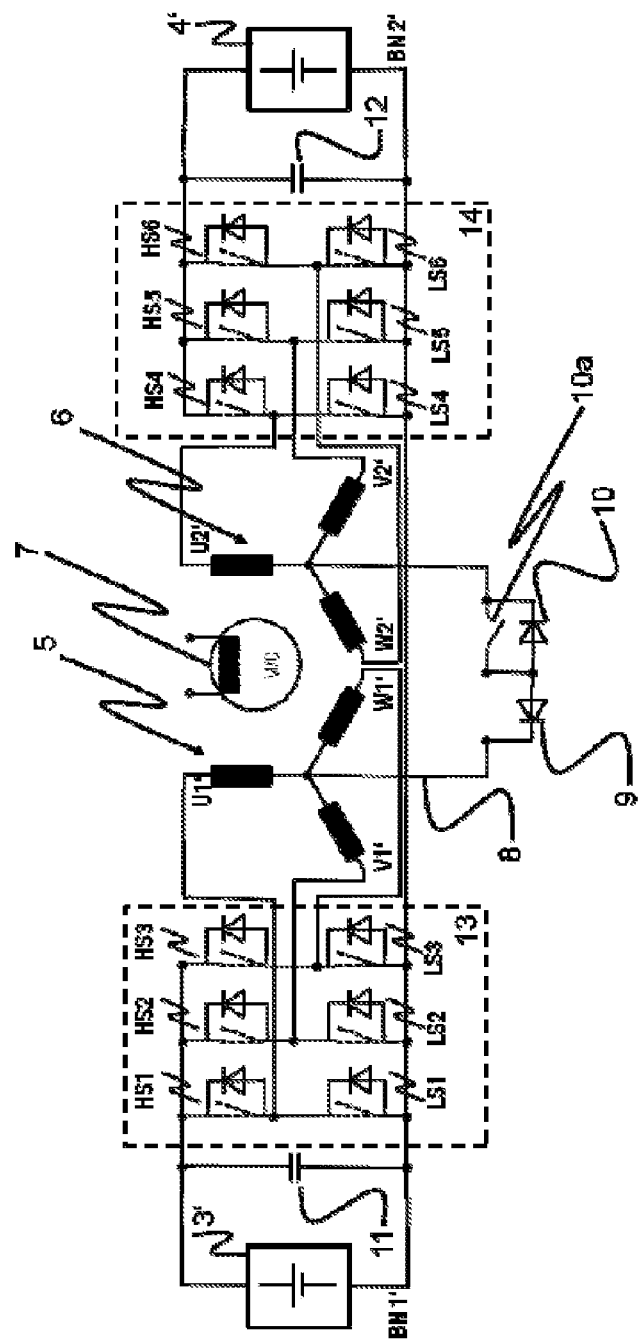
Figure 4:
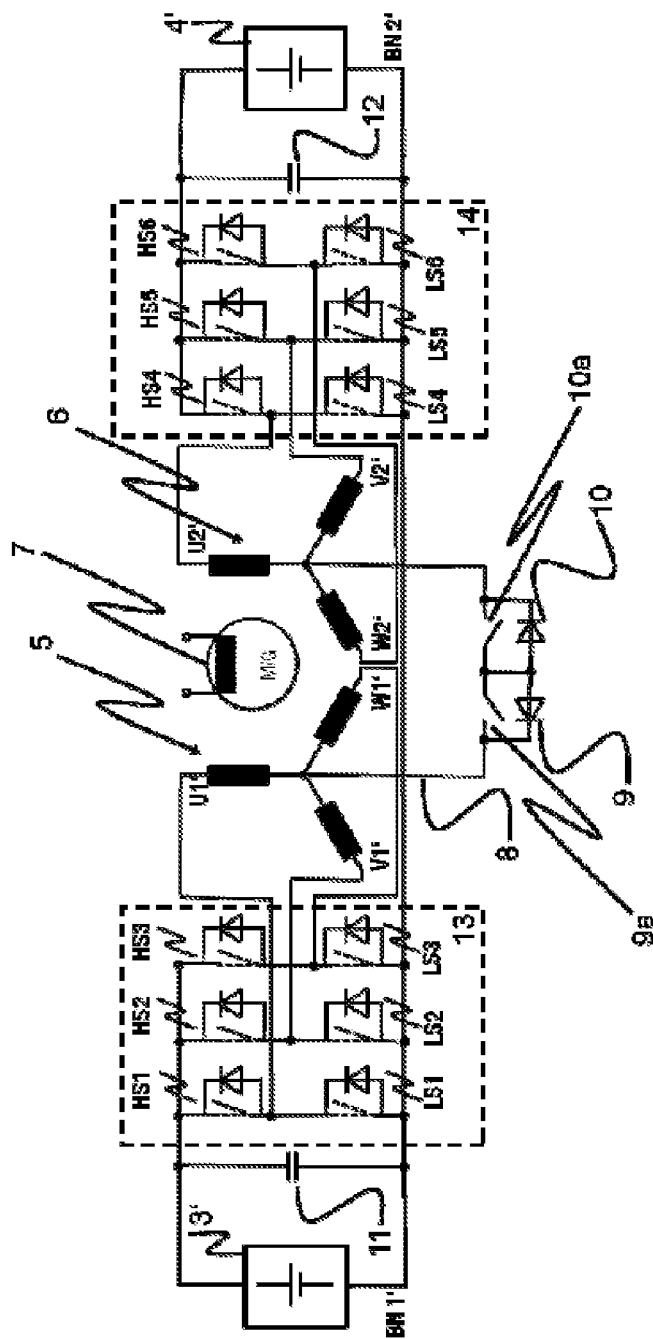

The two star points of the two 3-phase coil system are directly connected to one another by way of an electrical path (8), wherein the electrical path is provided with two oppositely directed, in series-connected diodes (9, 10), and is provided with a switch (9a, 10a) that is connected in parallel to the diode (9) (see FIG. 2) or the diode (10) (see FIG. 3). FIG. 4 shows a configuration with two switches (9a, 10a), each connected in parallel to one of the diodes (9, 10).

One each combination of diode and parallel switch can be configured as MOSFET or as IGBT with freewheel diode. With a MOSFET, the diode is formed from the substrate diode of the MOSFET. The electrical path (8) is configured such that it is designed for transmitting electrical power up to a pre-determined level. This can be ensured by way of a suitable performance cross-section, for example. As an alternative, a plurality of electrical paths can be connected in parallel in order to increase the current load bearing capacity, wherein an electrical path corresponds to the configuration of the electrical path (8).

The two 3-phase coil systems are each controlled via a parallel connection of an intermediate circuit capacitor (11, 12) and a converter (13, 14).

In FIGS. 2 to 6, the BN1' is connected to the stator system (5) via the intermediate circuit capacitor (11) and the converter (13). The BN2' is connected to the stator system (6) via the intermediate circuit capacitor (12) and the converter (14).

The intermediate circuit capacitors (11, 12) supply the high-frequency alternating component of the machine currents and smooth the output voltage of the machine in the generator-operated mode. In this way, the harmonic interferences in both onboard power systems can be reduced.

Each of the two converters (13, 14) comprises six switches having parallel connected freewheeling diodes (HS1, HS2, HS3, LS1, LS2, LS3, HS4, HS5, HS6, LS4, LS5, LS6). Without loss of generality, the switch-freewheeling diode combinations are configured as MOSFETS, which are also referred to as power switches. IGBTs with freewheeling diode are also preferably used in onboard power systems with high nominal voltage level (in particular >>100 V). The switches are connected to the respective coil system via a half-bridge circuit arrangement of an inverter, known to those skilled in the art. The inverter (13) comprises three half bridges, wherein the first half bridge is formed by the MOSFETs (HS1, LS1), the second half bridge is formed by the MOSFETs (HS2, LS2), and the third half bridge is formed by the MOSFETs (HS3, LS3). The inverter (14) comprises three half bridges, wherein the first half bridge is formed by the MOSFETs (HS4, LS4), the second half bridge is formed by the MOSFETs (HS5, LS5), and the third half bridge is formed by the MOSFETs (HS6, LS6).

Those power switches connected to the higher potential of the respective onboard power system (HS1, HS2, HS3, HS4, HS5, HS6), are called high side switches. Those power switches connected to the lower potential of the respective onboard power system (LS1, LS2, LS3, LS4, LS5, LS6) are called low side switches. The coil sides of the coil systems facing away from the star point are each connected to a half bridge of the respective inverter, that is, the coils are connected on this coil side to the electrical potential, which exists between the power switches of a half bridge, respectively. For example, when closing the switch (LS6) of the inverter (14), the coil (W2) can be connected to the lower potential of the onboard power system (BN2'), and when closing the switch (HS5) of the inverter (14), the coil (V2') can be connected to the higher potential of the onboard power system (BN2').

The switch and freewheeling diode dispose of sufficient blocking voltage strength, corresponding to, for example, twice the value of the nominal voltage level of the onboard power system, to which the inverter is dedicated.

In the exemplary embodiments according to FIGS. 2 to 6, the BN2' is configured as a conventional 14V onboard power system without loss of generality. The energy store (4) can be a lead-acid battery of AGM technology with 12V nominal voltage level, for example. Compared to BN2', the BN1' is on a higher nominal voltage level of 48V having a 48V energy store, which, for example, can be designed in lithium-ion technology. With respect to the voltage levels of BN1' and BN2' and the respective energy stores, any desired configuration is conceivable, wherein the nominal voltage level of BN1' exceeds the nominal voltage level of BN2'.

The two 3-phase stator systems (5, 6) are adapted to the nominal voltage levels of the two onboard power systems (BN1', BN2'), for example, via a different winding number of the coils (U2', V2', W2') as compared to the coils (U1', V1', W1') with regard to design. This means that the coil system (U2', V2', W2') is configured in a low-ohmic manner as compared to the coil system (U1', V1', W1'), in order to reduce the power loss at comparable performance at an on average lower voltage level and on average increased flows.

According to FIGS. 2 to 4, the electric machine can be operated with opened switches (9a, 10a). No power is thereby transferred between the onboard power systems (BN1') and (BN2'), this mode is referred to as normal mode. Due to the blocking effect of the two substrate diodes of the MOSFETs (9, 10), the star points are electrically decoupled, and the electric machine can be motor-operated or generator-operated. The actuation of the two stator systems is done, for example, by way of a 3-phase, pulse-width modulated actuation of the inverters (13, 14) by means of field-oriented regulation and, for example, space vector modulation of the switching positions of the low side switches and the high side switches of the inverters. The pulse-width modulated switching position of the line circuit breakers is indicated in FIGS. 1 to 4 by dotted illustrations of the switching positions. The actuation can be done by means of a microprocessor of FPGA, for example. The presetting of parameter values such as, for example, torque, rotational speed, voltage and output is done by way of a control unit of the vehicle, for example.

With the switches (9a, 10a) open, the electric machine can also be operated in a mixed mode, that is, for example, in motor operating mode with regard to the onboard power system (BN1'), and in generator operating mode with regard to the onboard power system BN2'. This means that in this case, power is transferred from onboard power system (BN1') to onboard power system (BN2'). This power transfer operation can be carried out independently of whether a torque is tapped off the shaft of the rotor by a mechanical load, or a torque is applied to the shaft by a motor. If no torque is tapped off the rotor externally, nor is a torque applied to the rotor, with the electric machine running, energy is transferred exclusively between the two onboard power subsystems.

According to a further operational mode of the electric machine, with the rotor being stationary and unexcited, that is, with no excitation voltage applied to the rotor, the electric machine can be operated as step-down converter, that is, for transferring electrical power of BN1' to BN2', in accordance with FIGS. 2 and 4. This mode is called buck operating mode and is illustrated in FIG. 5.

Figure 5:
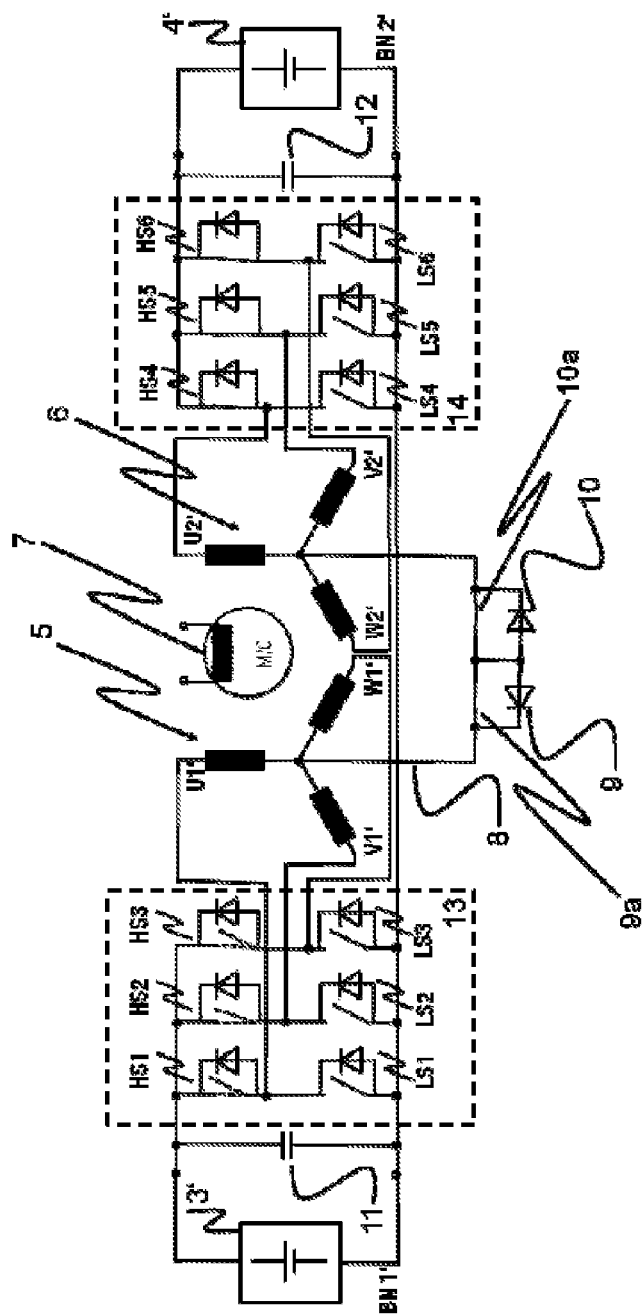

In buck operating mode, both switches (9a, 10a) are permanently closed, according to FIG. 5 in combination with FIG. 4. For the embodiment according to FIG. 2, the switch (9a) is permanently closed in buck operating mode. This means that in buck operating mode, the two star points are located on the same electrical potential. The switches (HS4, HS5) are permanently closed, and the switches (LS4, LS5, LS6) are permanently open so that the coil ends facing away from the star point are located on the higher potential of the onboard power system (BN2'). The switches (LS1, LS2, LS3) are permanently closed.

In order to improve the start-up behavior during the transfer from the rotating operation to the standstill operation, the low side switches (LS4, LS5, LS6) can also initially be closed and the high side switches (HS4, HS5, HS6) can be opened. Thus, the full input voltage lies across the effective inductance instead of the difference of the input and output voltage, as a result of which a higher current increase is achieved. The transition to the stationary operation is regulated by pulse-width modulated operation of the high side (HS4, HS5, HS6) and low side (LS4, LS5, LS6) of the second inverter.

In addition, the exciter current circuit of the rotor can be short-circuited to ensure that, in buck operating mode, the rotor always remains in a motion-free state. A movement of the rotor by electromagnetically induced forces in the inductive system of the rotor results in an unnecessary loss of energy. Moreover, with a rigid connection of the rotor shaft to the crank shaft of the vehicle or to a gear shaft, for example, such induction movements would mean a drive torque of the vehicle that would be undesired in this operating state.

The switches (HS1, HS2, HS3) are synchronously actuated by pulse-width modulation. Since in a standstill state, the inductances of the individual phases of the stator systems can be of different magnitude depending on the rotor position, due to residual magnetization by existing magnets or remanence in the stator lamination, as the case may be, the pulse-width modulated duty ratio of the switches (HS1, HS2, HS3) can also be of different magnitude. The switches (LS1, LS2, LS3) are operated permanently opened or complementary to the switches (HS1, HS2, HS3). The actuation of the inverter (13) can be done by means of a microprocessor of FPGA, for example, the specifications for voltage, current, or output can be done by way of a control unit of the vehicle, for example.

Complementary switching means that in a half bridge, high side and low side switches are alternately switched on, for example, if the high side switch is closed, the low side switch is open, and vice versa.

Complementary switching results in lower conduction losses. Conduction losses are to be understood as a current flowing through a not ideal semiconductor structure causing power losses. With a diode, losses occur according to the product of the forward voltage of the semiconductor structure and the current passing through as well as according to the product of the temperature-dependent, differential path resistance and the current passing through squared. If MOSFETs are used for switches, the conduction losses only come about from the product of the current squared, and the temperature-dependent ON resistance of the MOSFET in the switched-on state. With current flowing through the MOSFET instead of the diode, the total conduction loss is thus lower.

Pulse duty ratio $D_{BUCK}$ is the ratio of switch-on time $T_{BUCK}$ and period duration $P_{BUCK}$. The switching frequency $F_{BUCK}$ denotes the inverse of the period duration $P_{BUCK}$, the switch-on time $T_{BUCK}$ reaches maximally the period duration $P_{BUCK}$. In buck operating mode, a voltage $U_{BUCK,BN2'}$ with $U_{BUCK,BN2'} \propto D_{BUCK} \cdot U_{BN1'}$ results in the onboard power system BN2'.

As an alternative to synchronous pulse-width modulated actuation, actuation by pulse-width modulation offset at a specific angle is also possible, which is referred to as interleaved mode. With a 3-phase stator system, the high side switches (HS1, HS2, HS3) are thereby connected at a 120° phase shift. However, as a result thereof, a rotating field may materialize in the coil system (U1', V1', W1') and/or (U2', V2', W2'). It is advantageous, that with this actuating method, the current ripple at the intermediate circuit capacitor (12) can be reduced.

If in the selected example the approximately 12V AGM battery of the BN2' close to its final discharge voltage of 10.5V, and the li-ion store is at a voltage level of close to that of its nominal voltage level of 48V, the AGM battery can be charged by means of the li-ion store such that by setting a predetermined, controllable pulse duty ratio of 0.3, a target charging voltage of 14.4V is set on the AGM battery.

According to FIGS. 3 and 4, with a stationary and unexcited rotor, that is, without excitation voltage applied on the rotor, the electric machine can be operated as a step-up converter, that is, for the transfer of electrical power of BN2' to BN1'. This mode is called boost operating mode and is illustrated in FIG. 6.

Figure 6:
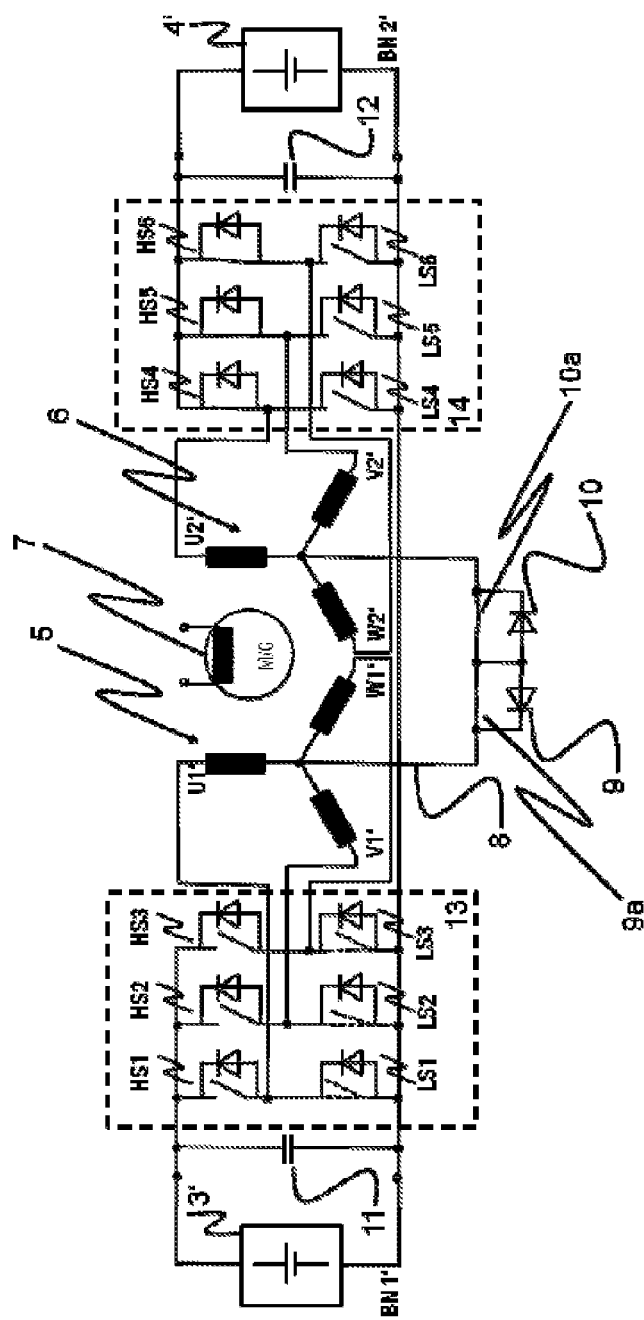

In FIG. 6 in combination with FIG. 4, the two switches (9a, 10a) are permanently closed in the boost operating mode. In the boost operating mode for the embodiment according to FIG. 3, the switch (10a) is permanently closed. This means that in boost operating mode, the two star points are located on the same electrical potential. The switches (HS4, HS5, HS6) are permanently closed, and the switches (LS4, LS5, LS6) are permanently open so that the coil ends facing away from the star point are located on the higher potential of the onboard power system (BN2'). Thus, the switch positions of the inverter (14) correspond to those of the buck operating mode. In addition, as in the buck operating mode, the exciter current circuit of the rotor can be short-circuited. The switches (LS1, LS2, LS3) are simultaneously actuated in a pulse-width modulated manner. Since in the standstill state, the inductances of the individual phases of the stator systems can be of different magnitudes depending on the rotor position, due to residual magnetization by existing magnets or remanence in the stator lamination, as the case may be, the pulse-width modulated pulse duty ratio of the switches (LS1, LS2, LS3) can also be of different magnitude.

The switches (HS1, HS2, HS3) are actuated permanently opened or complementary to the switches (LS1, LS2, LS3).

Pulse duty ratio $D_{BOOST}$ is the ratio of switch-on time $T_{BOOST}$ and period duration $P_{BOOST}$. The switching frequency $F_{BOOST}$ denotes the inverse of the period duration $P_{BOOST}$, the switch-on time $T_{BOOST}$ reaches maximally the period duration $P_{BOOST}$. In the boost mode, a voltage $U_{BOOST,BN1'}$ with $U_{BOOST,BN1'} \propto (1(1/(1-D_{BOOST})) \cdot U_{BN2'}$ results in the onboard power system BN1'. The inverter diodes connected in parallel to the opened switches (HS1, HS2, HS3) prevent a voltage loss of the onboard power system (BN1') at the point in time of closed switches (LS1, LS2, LS3).

As an alternative to synchronous pulse-width modulated actuation, actuation by pulse-width modulation offset at a specific angle is also possible, which is referred to as interleaved mode. With a 3-phase stator system, the low side switches (LS1, LS2, LS3) are thereby connected at a 120° phase shift. However, as a result thereof, a rotating field may materialize in the coil system (U1', V1', W1') and/or (U2', V2', W2'). It is advantageous, that with this actuating method, the current ripple at the intermediate circuit capacitor (11) can be reduced.

If in the selected example, the 48V li-ion store is greatly discharged, and the AGM battery is at the same time sufficiently charged with a voltage of 12V, the li-ion store can by charged by means of the AGM battery such that by setting a predetermined, controllable pulse duty ratio of 0.8, a target charging voltage of 60V is set on the li-ion store. If the li-ion store has a high charge acceptance, and thus a high power uptake at its disposal, the duty ratio starting from 0.8 is to be regulated to a higher value by way of the machine control unit in order to maintain the target charging voltage of 60V on the li-ion store, with the voltage of the AGM battery decreasing at the same time.

With increasing duty ratio $D_{BUCK}$, or $D_{BOOST}$, at constant switching frequency $F_{BUCK}$, or switching frequency $F_{BOOST}$, more electric energy per unit of time can be transferred from one onboard power system to the other onboard power system. The voltage to be applied to the respective other onboard power system, and thus also the transmission power in the buck operating mode, or the boost operating mode, can thus be regulated via the parameter duty ratio.

The advantage of the invention is that via the electric machine and the inverters utilized for operating the electric machine, a circuit arrangement that with simple means can be integrated between the star points of the two coil systems, power can be transferred between the two onboard power systems. This has the advantage that without using a direct current regulator (2) as in FIG. 1, energy from one onboard power subsystem of the vehicle can be transferred to the other onboard power subsystem of the vehicle without the need for the electric machine to be in operation.

A further particular advantage is the ability to adjust a power transfer direction (buck and/or boost operating mode) based on the design of the transfer circuit having either one switch or two switches, each connected in parallel to the first and/or second diode.

If bi-directional operation (buck and boost operating mode) is desired, two switches (9a and 10a) are used (see FIG. 4). Thus, a current flow via the two closed switches (9a and 10a) in both directions from onboard power system (BN1') to onboard power system (BN2'), or from onboard power system (BN2') to onboard power system (BN1') is possible.

If an energy transfer solely from onboard power system (BN1') to onboard power system (BN2') is desired, just the switch (9a), which is connected in parallel to the first diode (9), is sufficient (see FIG. 2). Thus, a current flow from onboard power system (BN1') to onboard power system (BN2') via the closed switch (9a) and the diode (10) polarized in the direction of flow is possible.

If an energy transfer solely from onboard power system (BN2') to onboard power system (BN1') is desired, just the switch (10a), which is connected in parallel to the second diode (10), is sufficient (see FIG. 3). Thus, a current flow from onboard power system (BN2') to onboard power system (BN1') via the closed switch (10a) and the diode (9) polarized in the direction of flow is possible.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle having a multiphase electric machine comprising a first onboard power subsystem provided with a first nominal DC voltage level, and a second onboard power subsystem provided with a second nominal DC voltage level, wherein the electric machine comprises a rotor, a first stator system, and a second stator system, the first onboard power subsystem comprises a first inverter having a first intermediate circuit capacitor, the first stator system is dedicated to the first inverter, the second onboard power subsystem comprises a second inverter having a second intermediate circuit capacitor, and the second stator system is dedicated to the second inverter, wherein
   the first stator system is configured in a star connection,
   the second stator system is configured in a star connection, and
   a transfer circuit connects the star point of the first stator system to the star point of the second stator system,
   wherein the transfer circuit comprises a first diode and a second diode, wherein the first diode and the second diode are series connected in opposite directions.

2. The vehicle according to claim 1, wherein the transfer circuit comprises a first switch connected in parallel to the first diode.

3. The vehicle according to claim 2, wherein
   the first inverter is provided with three high side switches and three low side switches,
   the second inverter is provided with three high side switches and three low side switches,
   the three high side switches of the first inverter and the three low side switches of the first inverter can be controlled in a pulse-width modulated manner,
   the three high side switches of the second inverter and the three low side switches of the second inverter can be controlled in a pulse-width modulated manner, and
   with one of the first switch and the second switch open, the electric machine is operable as a motor or a generator, or in a mixed mode, by pulse-width modulated actuation of the high side switches and the low side switches of the first inverter and the second inverter.

4. The vehicle according to claim 2, wherein
the first nominal DC voltage level exceeds the second nominal DC voltage level in the direction of higher nominal DC voltage level,
with the rotor being stationary, the electric machine is operable as a DC step-down converter between the first onboard power subsystem and to the second onboard power subsystem.

5. A method for operating the multiphase electric machine of claim 4, the method comprising the acts of:
opening the low side switches of the second inverter;
closing the high side switches of the second inverter;
opening the low side switches of the first inverter; and
controlling the high side switches of the first inverter in a pulse-width modulated manner.

6. The vehicle according to claim 1, wherein the transfer circuit comprises a second switch connected in parallel to the first diode.

7. The vehicle according to claim 6, wherein
the first inverter is provided with three high side switches and three low side switches,
the second inverter is provided with three high side switches and three low side switches,
the three high side switches of the first inverter and the three low side switches of the first inverter can be controlled in a pulse-width modulated manner,
the three high side switches of the second inverter and the three low side switches of the second inverter can be controlled in a pulse-width modulated manner, and
with one of the first switch and the second switch open, the electric machine is operable as a motor or a generator, or in a mixed mode, by pulse-width modulated actuation of the high side switches and the low side switches of the first inverter and the second inverter.

8. The vehicle according to claim 6, wherein
the first nominal DC voltage level exceeds the second nominal DC voltage level in the direction of higher nominal DC voltage level, and
with the rotor being stationary, the electric machine is operable as DC step-up converter between the first onboard power subsystem and to the second onboard power subsystem.

9. The method according to claim 8, wherein the rotor is short-circuited.

10. The vehicle according to claim 1, wherein the transfer circuit comprises a first switch connected in parallel to the first diode, and wherein the transfer circuit comprises a second switch connected in parallel to the second diode.

11. The vehicle according to claim 10, wherein
the first inverter is provided with three high side switches and three low side switches,
the second inverter is provided with three high side switches and three low side switches,
the three high side switches of the first inverter and the three low side switches of the first inverter can be controlled in a pulse-width modulated manner,
the three high side switches of the second inverter and the three low side switches of the second inverter can be controlled in a pulse-width modulated manner, and
with one of the first switch and the second switch open, the electric machine is operable as a motor or as a generator, or in a mixed mode, by pulse-width modulated actuation of the high side switches and the low side switches of the first inverter and the second inverter.

12. A method for operating the multiphase electric machine of claim 11, the method comprising the acts of:
opening the low side switches of the second inverter;
closing the high side switches of the second inverter;
opening the low side switches of the first inverter; and
controlling the high side switches of the first inverter in a pulse-width modulated manner.

13. The vehicle according to claim 10, wherein
the first nominal DC voltage level exceeds the second nominal DC voltage level in the direction of higher nominal DC voltage level, and
with the rotor being stationary, the electric machine is operable as a DC step-down converter between the first onboard power subsystem and to the second onboard power subsystem.

14. The method according to claim 13, wherein the rotor is short-circuited.

15. The vehicle according to claim 10, wherein
the first nominal DC voltage level exceeds the second nominal DC voltage level in the direction of higher nominal DC voltage level, and
with the rotor being stationary, the electric machine is operable as DC step-up converter between the first onboard power subsystem and to the second onboard power subsystem.

* * * * *